United States Patent [19]
Knapp

[11] Patent Number: 5,985,473
[45] Date of Patent: Nov. 16, 1999

[54] LOW-TEMPERATURE BARIUM/LEAD-FREE GLAZE FOR ALUMINA CERAMICS

[75] Inventor: Randy Owen Knapp, Central, S.C.

[73] Assignee: Cooper Automotive Products, Inc., Houston, Tex.

[21] Appl. No.: 08/971,343

[22] Filed: Nov. 17, 1997

[51] Int. Cl.⁶ .............................. B32B 9/00; C03C 3/078
[52] U.S. Cl. ..................... 428/702; 428/432; 427/427; 313/117; 501/14; 501/72
[58] Field of Search .................... 501/55, 65, 66, 501/68, 69, 70, 72, 67, 14, 27, 26; 428/432, 701, 702; 313/118; 427/126.2, 397.7, 427

[56] References Cited

U.S. PATENT DOCUMENTS

| | | | |
|---|---|---|---|
| 2,972,543 | 2/1961 | Beals | 106/48 |
| 4,084,976 | 4/1978 | Hinton | 106/48 |
| 4,120,733 | 10/1978 | Knapp | 106/48 |
| 4,256,497 | 3/1981 | Knapp | 106/48 |
| 4,282,035 | 8/1981 | Nigrin | 106/54 |
| 4,316,963 | 2/1982 | Hommel et al. | 501/14 |
| 4,547,625 | 10/1985 | Tosaki et al. | 174/68.5 |
| 4,624,934 | 11/1986 | Kokubu et al. | 501/17 |
| 4,746,578 | 5/1988 | Kondo et al. | 428/432 |
| 4,748,137 | 5/1988 | Nigrin | 501/46 |
| 4,814,298 | 3/1989 | Nelson et al. | 501/17 |
| 5,204,291 | 4/1993 | Nigrin | 501/21 |
| 5,292,690 | 3/1994 | Kawachi et al. | 501/33 |
| 5,362,687 | 11/1994 | Tokunaga | 501/21 |
| 5,518,968 | 5/1996 | Knapp | 501/14 |
| 5,677,250 | 10/1997 | Knapp | 501/14 |
| 5,744,409 | 4/1998 | Hashimoto et al. | 501/65 |
| 5,885,915 | 3/1999 | Bako et al. | 501/66 |

FOREIGN PATENT DOCUMENTS 56-149342  11/1981  Japan .

*Primary Examiner*—Timothy Speer
*Assistant Examiner*—Stephen Stein
*Attorney, Agent, or Firm*—Fish & Richardson, P.C.

[57] ABSTRACT

A barium/lead-free ceramic glaze includes by weight:

(i) between about 44 and 50% $SiO_2$;
(ii) between about 7 and 13% $Al_2O_3$;
(iii) between about 22 and 26% $B_2O_3$;
(iv) between about 3 and 9% CaO;
(v) between about 1 and 3% SrO;
(vi) up to about 2% ZnO;
(vii) between about 2 and 4% $K_2O$;
(viii) up to about 2% $Li_2O$; and
(ix) between about 5 and 9% $Na_2O$.

This barium/lead-free glaze can be effectually applied to a ceramic substrate at firing temperatures on the order of 1550 to 1650° F. (843 to 899° C.).

17 Claims, No Drawings

LOW-TEMPERATURE BARIUM/LEAD-FREE GLAZE FOR ALUMINA CERAMICS

BACKGROUND OF THE INVENTION

The present invention relates to barium-free and lead-free ceramic glazes that can be employed with ceramic articles such as spark plug insulators.

Glazes, continuous coatings that are fusion bonded onto a substrate, can serve a variety of purposes: (1) render the substrate impermeable to liquids and gases; (2) aesthetics, e.g., covering blemishes and providing decorative effects; (3) protection; and (4) increased strength.

One property of a glaze that can be particularly important is its thermal coefficient of expansion. In order to avoid undue stresses which can cause spalling, chipping, cracking or crazing, a glaze should have a low thermal coefficient of expansion. A glaze preferably has a thermal coefficient that is similar to the ceramic substrate to which it is applied, e.g., on the order of from 6 to 7 microinches per inch per ° C. In fact, glazes having this low coefficient of thermal expansion can strengthen an alumina insulator by inducing compressive stresses at the surface of the glaze-insulator composite.

It is further recognized that glazes can be modified to change their properties, e.g., maturing temperature, color, and coefficient of thermal expansion. However, the highly complex, multi-component nature of glazes makes predicting the effect of varying or substituting chemical compounds in a glaze formulation difficult, even where the general properties of the individual components may be recognized.

In addition, glazes are not homogeneous, that is, they may contain one or more dispersed undissolved phases, thus the ultimate components shown by chemical analysis may not effectively describe a glaze in a manner such that the properties are readily predictable.

The composition of glazes has evolved for other reasons. For example, lead found much use in traditional glazes, however, toxicity issues surrounding lead have fostered the development of "lead-free" glazes. Examples of "lead-free" glazes can be found in U.S. Pat. No. 4,084,976 and U.S. Pat. No. 4,120,733. The composition described above includes 48 to 54% $SiO_2$, from 7 to 11% $Al_2O_3$, from 16.5 to 20% $B_2O_3$, from 11 to 14% BaO, from 2 to 3% CaO, from 2 to 2.5% ZnO, from 4.25 to 5.25% $Na_2O$, and from 0.4 to 1% $K_2O$, $Li_2O$ and MgO.

Finally, glazes that are both lead-free and barium-free are also known. See, for example, U.S. Pat. No. 4,256,497.

Spark plug insulators comprise one class of ceramic substrates that are often used with a glaze. The exterior portions of spark plug insulators are exposed to dirt and grease which may result in the formation of an electrically conducting surface and premature failure of the spark plugs. Because of this, alumina insulator bodies of spark plugs are glazed to minimize dirt and grease build-up, and to increase the strength and imperviousness of the surface.

However, the introduction of glaze onto spark plugs has encountered its own set of problems. For example, in the manufacture of a spark plug, two separate firing steps are typically employed in connection with an already sintered bisque alumina insulator. The first involves glost firing raw-glazed insulators, i.e., the ceramic component of the plug, at 2050–2150° F. (1121–1177° C.). A second firing step is then carried out at reduced temperatures, e.g., between 1550 and 1650° F. (843 and 899° C.), to incorporate a carbon-based, Fired-In Suppressor glass seal that results in the production of spark plug core assemblies, where a "core assembly" is a glazed insulator with a contained internal center electrode component.

Reduced temperatures are required in this second firing step due to the temperature-sensitive nature of certain of the components of the Fired-In Suppressor glass seal. Moreover, the necessity for carrying out two separate firing steps adds to both the cost and the time involved in glazing and glass sealing the unit.

SUMMARY OF THE INVENTION

The present invention relates to the surprising discovery of barium-free and lead-free glazes that are capable of being fired at temperatures from 250–400° F. below the temperatures believed necessary to fire recognized compositions.

In one aspect, the invention features a barium-free and lead-free ceramic glaze comprising, by weight:

(i) between about 44 and 50% $SiO_2$;
(ii) between about 7 and 13% $Al_2O_3$;
(iii) between about 22 and 26% $B_2O_3$;
(iv) between about 3 and 9% CaO;
(v) between about 1 and 3% SrO;
(vi) up to about 2% ZnO;
(vii) between about 2 and 4% $K_2O$;
(viii) up to about 2% $Li_2O$; and
(ix) between about 5 and 9% $Na_2O$.

In a second aspect of this invention, a spark plug including an alumina insulator is coated with the above composition.

The invention also relates to a method for applying a barium-free/lead-free glaze onto a ceramic article. This method includes (i) coating the ceramic article with a slurry having a solids content between about 40 and 60% and (ii) firing the coated ceramic article at a temperature between 1550 and 1650° F. (843 and 899° C.). One area in which this method can be employed involves the manufacture of spark plug assemblies.

DETAILED DESCRIPTION OF PREFERRED EMBODIMENTS

As discussed above, the glaze according to the invention is barium-free, lead-free, and substantially free of zinc compounds. Moreover, this glaze is capable of being fired at a temperature of 1650° F. or less.

By "free" it is meant that there is less than 0.25%, by weight of barium or lead compounds respectively in the glaze. By "substantially-free" is meant that there is less than about 2% by weight of zinc containing compounds in the glaze.

One example of a preferred ceramic glaze according to the invention comprises, by weight:

(i) between about 44 and 50% $SiO_2$;
(ii) between about 7 and 13% $Al_2O_3$;
(iii) between about 22 and 26% $B_2O_3$;
(iv) between about 3 and 9% CaO;
(v) between about 1 and 3% SrO;
(vi) up to about 2% ZnO;
(vii) between about 2 and 4% $K_2O$;
(viii) up to about 2% $Li_2O$; and
(ix) between about 5 and 9% $Na_2O$, with the balance being minor impurities.

More preferred glazes have the following composition:

TABLE I

| OXIDE | PERCENT BY WEIGHT |
|---|---|
| $SiO_2$ | 44.1–49.8 |
| $Al_2O_3$ | 7.7–12.3 |
| $B_2O_3$ | 22.9–25.1 |
| CaO | 3.1–8.5 |
| SrO | 1.3–2.7 |
| ZnO | 0.8–1.7 |
| $K_2O$ | 2.7–3.3 |
| $Li_2O$ | 0.8–1.8 |
| $Na_2O$ | 5.1–9.0 |

In looking at the individual oxides present in the glazes, one should keep in mind the following:

Control of the amount of silica is important, since if the silica is too high, the glaze normally becomes excessively refractory; if the silica is too low, the glaze in many cases, depending on other ingredients present, can become too soluble and, therefore, unstable.

The amount and character of the other components can greatly modify the effect of the silica present. For example, alumina can increase the viscosity and retard macrocrystalline growth. High viscosity is typically undesirable in a glaze because it prevents healing of pinholes, scratches, and other minor flaws.

The alkalies are strong fluxes and can increase the fluidity of the molten glaze. Increasing the amount of alkali compounds present in the glaze can increase the coefficient of thermal expansion, and can have a direct bearing upon crazing of the glaze.

The alkaline earths can also act as vigorous fluxes in a glaze composition. For example, CaO can act as a flux at temperatures of 2,000° F. (1093° C.) and above; excess calcia can cause loss of refractoriness and devitrification, leading to a low-gloss matte texture, possibly as the result of formation of anorthite ($CaO.SiO_2$). Magnesia can act as a vigorous flux at higher temperatures, and can lower the coefficient of thermal expansion to a far greater degree than other bases.

The ultimate composition of a glaze, particularly a glaze containing ten or more oxides, can be complex. As discussed above, this complexity can make predicting the effect of varying or substituting chemical compounds in a glaze formulation difficult. However, the raw materials of glazes are typically oxides or compounds that can be expressed as oxides, thus enabling the components to be described in terms of "phase" compositions having known characteristics. Because of this, glaze ceramists commonly use a system of expressing oxide compositions in terms of molar proportions, i.e., molecular equivalents. By means of molecular equivalents, an empirical oxide formula can be calculated for each glaze composition.

For purposes of arriving at an empirical molecular formula, oxides are classified as either basic, neutral (or amphoteric), or acid. The glaze oxides which are classified as bases, that is, the alkali metal and alkaline earth oxides, are designated as "$R_2O$" and "RO" respectively. The neutral or amphoteric oxides are designated as "$R_2O_3$" while acid oxides are designated as "$RO_2$".

The empirical molecular formula basis of the glaze composition of Examples 1a and 1b that appear later in this specification, is shown in Table II below:

TABLE II

| CHEMISTRY OXIDE | CHEMISTRY SYMBOL | WEIGHT % | MOLECULAR WEIGHT | MOLES (Wt./Molecular Wt.) | "NORMALIZED MOLE FRACTION" |
|---|---|---|---|---|---|
| $SiO_2$ | $RO_2$ | 46.94 | 60.1 | 0.7811 | 2.605 |
| $Al_2O_3$ | $R_2O_3$ | 10.10 | 102.0 | 0.0990 | 0.330 |
| $B_2O_3$ | $R_2O_3$ | 24.02 | 69.6 | 0.3451 | 1.151 |
| CaO | RO | 4.37 | 56.1 | 0.0778 | 0.260 |
| SrO | RO | 2.00 | 103.6 | 0.0193 | 0.064 |
| ZnO | RO | 1.34 | 81.4 | 0.0152 | 0.051 |
| $K_2O$ | $R_2O$ | 3.01 | 94.2 | 0.0319 | 0.106 |
| $Li_2O$ | $R_2O$ | 1.33 | 29.9 | 0.0445 | 0.148 |
| $Na_2O$ | $R_2O$ | 6.89 | 62.0 | 0.1111 | 0.371 |
| Impurities | | Trace | N/A | N/A | N/A |

In establishing the empirical formula for a glaze, the formula is "normalized" so that the sum of $R_2O$ and RO is brought to unity. For example, in Table II, the sum of RO plus $R_2O$ equals 0.300 mole; dividing each of the "MOLES" obtained by the total moles of RO and $R_2O$ establishes the empirical formula for the glaze, given in the last column as "Normalized Mole Fraction". By means of the empirical formula, the calculation of batch weights or the determination of the proportions of ingredients required to produce a glaze having a given formula is simplified, especially if it is desired to formulate the glaze from compounds other than oxides, such as for example, carbonates. Further, the comparison of glaze formulations can be greatly simplified.

In the context of the invention, both suitable and preferred arrays are set forth in Table III.

TABLE III

| CHEMISTRY | | MOLECULAR EQUIVALENTS OF OXIDE COMPONENT | |
|---|---|---|---|
| Oxide | Symbol | Suitable | Preferred |
| $SiO_2$ | $RO_2$ | 2.1–3.0 | 2.352–2.715 |
| $Al_2O_3$ | $R_2O_3$ | 0.2–0.5 | 0.223–0.426 |
| $B_2O_3$ | $R_2O_3$ | 0.8–1.5 | 0.973–1.274 |
| CaO | RO | 0.15–0.5 | 0.195–0.443 |
| SrO | RO | 0.02–0.1 | 0.039–0.086 |
| ZnO | RO | 0.02–0.08 | 0.030–0.069 |
| $K_2O$ | $R_2O$ | 0.07–0.13 | 0.085–0.124 |
| $Li_2O$ | $R_2O$ | 0.07–0.22 | 0.083–0.199 |
| $Na_2O$ | $R_2O$ | 0.2–0.6 | 0.243–0.507 |

The barium and lead-free ceramic glazes of the present invention can be applied to any of these ceramic substrates, e.g., high alumina ceramic substrates, which are typically coated with a glaze. Included among such substrates are chemical laboratory ware, washers, spacers, tubes, electrical circuit components, power delivery insulators, sound isolation tiles, etc. One particularly preferred substrate is a spark plug insulator, which itself is typically made of 85 to 95% by weight alumina.

The glaze can be formulated into a water-based slip or slurry in accordance with techniques well known in the art. For example, the slip can be prepared by combining the glaze composition, often in a pre-melted or fritted form, with water and other optional minor ingredients to form a slip having a solids content ranging between about 40 and 60%. These optional components include naturally occurring raw materials, such as feldspar, limestone and clays. Other suitable additives include organic binder(s) such as emulsified wax, starches including (STARAMIC®), polyvinyl alcohol (PVA) and methylcellulose.

After formation, the slip is applied to the ceramic substrate by well-recognized means such as roller flooding, dipping or spraying.

The coated article then is fired. Such firing can be carried out at a temperature well below that traditionally employed in the art. For example, where the glaze is sprayed onto the substrate, a firing temperature can be 1650° F. or below, preferably between 1550 and 1650° F. (843 and 899° C.), can be used. On the other hand, a temperature less than about 1800° F., preferably between 1700 and 1800° F. (927 and 982° C.), can be employed for roll-on and dipped applications.

While the exact manner of firing is not critical to the present invention, firing typically is carried out in a suitable device, e.g., a glost kiln, for a period between 10 and 90 minutes. The firing cycle and its duration are designed to render a smooth, uniform glaze coating of high gloss and good strength.

The invention is capable of producing a number of significant advantages over the prior art. As mentioned above, the low temperature barium-free/lead-free ceramic glaze of the present invention can be fired at a temperature which is 250 to 400° F. (121 to 204° C.) below that of traditional lead-free ceramic glazes. Moreover, the properties of the glazed product are the same or better than that associated with more traditional glazes. For example, the breaking strength of insulators with the invention glaze is typically 40–60% above that of bisque ware without glaze. In addition, the invention can provide smoother coatings having higher gloss and fewer included bubbles, pinholes, etc. It also allows for more brilliant underglaze decorations.

The following examples are given by way of illustration and in no way should be construed as limiting the present invention.

EXAMPLES

Examples 1a and 1b

Bisque-fired spark plug insulators including 90% alumina were coated, by means of (a) spraying with a glaze slip composition including 55% by weight of solids and (b) rolling on a glaze slip composition including 45% by weight solids and comprising:

TABLE IV

| OXIDE | PERCENT BY WEIGHT |
| --- | --- |
| $SiO_2$ | 46.9 |
| $Al_2O_3$ | 10.1 |
| $B_2O_3$ | 24.0 |
| CaO | 4.4 |
| SrO | 2.0 |
| ZnO | 1.2 |
| $K_2O$ | 3.0 |
| $Li_2O$ | 1.3 |
| $Na_2O$ | 6.9 |
| $TiO_2$, $Fe_2O_3$, MgO | 0.2 |

*Formulae reported herein represent fired compositions, disregarding volatization, if any, of oxide ingredients during firing.

In Example 1a, the spray-coated ceramic was then fired at 1625° F. (885° C.) for 15 minutes to form a smooth, uniform glaze of high gloss and good strength. There was no evidence of crazing or devitrification in the glaze and there was achieved a strength increase of about 46% over bisque.

In Example 1b, the ceramic coated by rolling on was fired at 1775° F. (968° C.) for 30 minutes and gave a 52% increase over bisque.

Examples 2–17

The above procedure was repeated with similar results for glazes of the following compositions:

TABLE 4

| OXIDE | 2 | 3 | 4 | 5 | 6 | 7 | 8 | 9 | 10 | 11 | 12 | 13 | 14 | 15 | 16 | 17 |
| --- | --- | --- | --- | --- | --- | --- | --- | --- | --- | --- | --- | --- | --- | --- | --- | --- |
| $SiO_2$ | 44.1 | 44.4 | 45.7 | 46.3 | 46.5 | 47.2 | 47.8 | 48.0 | 48.2 | 48.4 | 48.6 | 48.7 | 48.8 | 49.1 | 49.4 | 49.7 |
| $Al_2O_3$ | 12.3 | 12.3 | 9.9 | 10.0 | 10.7 | 10.1 | 8.9 | 9.6 | 8.3 | 9.0 | 7.7 | 9.1 | 8.4 | 8.5 | 8.5 | 7.9 |
| $B_2O_3$ | 25.1 | 25.1 | 24.0 | 24.0 | 24.3 | 24.0 | 23.4 | 23.8 | 23.2 | 23.4 | 22.9 | 23.5 | 23.2 | 23.2 | 23.2 | 22.9 |
| CaO | 3.2 | 3.1 | 7.2 | 5.8 | 3.3 | 3.6 | 6.4 | 3.9 | 7.4 | 5.0 | 8.4 | 4.2 | 6.0 | 5.3 | 4.6 | 5.5 |
| SrO | 1.3 | 1.5 | 1.3 | 1.6 | 2.0 | 2.2 | 2.0 | 2.3 | 2.0 | 2.3 | 2.0 | 2.5 | 2.5 | 2.5 | 2.7 | 2.6 |
| ZnO | 0.8 | 0.9 | 0.8 | 1.0 | 1.2 | 1.4 | 1.2 | 1.5 | 1.2 | 1.5 | 1.2 | 1.6 | 1.5 | 1.5 | 1.7 | 1.7 |
| $K_2O$ | 3.3 | 3.3 | 3.1 | 3.0 | 3.1 | 3.0 | 2.9 | 2.9 | 2.8 | 2.9 | 2.7 | 2.8 | 2.8 | 2.7 | 2.8 | 2.7 |
| $Li_2O$ | 0.8 | 1.0 | 0.8 | 1.1 | 1.3 | 1.5 | 1.3 | 1.6 | 1.3 | 1.5 | 1.3 | 1.7 | 1.6 | 1.7 | 1.8 | 1.8 |
| $Na_2O$ | 9.0 | 8.3 | 7.0 | 7.0 | 7.4 | 6.9 | 5.9 | 6.3 | 5.4 | 5.8 | 5.1 | 5.8 | 5.3 | 5.3 | 5.2 | 5.1 |
| Minor Impurities | 0.1 | 0.1 | 0.2 | 0.2 | 0.2 | 0.1 | 0.2 | 0.1 | 0.2 | 0.2 | 0.1 | 0.1 | 0.1 | 0.2 | 0.1 | 0.1 |

Tables VI–VIII illustrate the "normalized" mole fractions for Example 1–17.

TABLE VI

EXAMPLES I–VI
LOW-TEMPERATURE BARIUM/LEAD-FREE GLAZE
COMPOSITIONS
"NORMALIZED" MOLE FRACTIONS*

CHEMISTRY

| Oxide | Symbol | I | II | III | IV | V | VI |
|---|---|---|---|---|---|---|---|
| $SiO_2$ | $RO_2$ | 2.605 | 2.562 | 2.609 | 2.352 | 2.464 | 2.681 |
| $Al_2O_3$ | $R_2O_3$ | 0.330 | 0.421 | 0.426 | 0.300 | 0.314 | 0.364 |
| $B_2O_3$ | $R_2O_3$ | 1.151 | 1.259 | 1.274 | 1.067 | 1.103 | 1.210 |
| CaO | RO | 0.260 | 0.199 | 0.195 | 0.397 | 0.331 | 0.204 |
| SrO | RO | 0.064 | 0.044 | 0.051 | 0.039 | 0.049 | 0.067 |
| ZnO | RO | 0.051 | 0.034 | 0.039 | 0.030 | 0.039 | 0.051 |
| $K_2O$ | $R_2O$ | 0.106 | 0.122 | 0.124 | 0.102 | 0.102 | 0.114 |
| $Li_2O$ | $R_2O$ | 0.148 | 0.094 | 0.118 | 0.083 | 0.118 | 0.151 |
| $Na_2O$ | $R_2O$ | 0.371 | 0.507 | 0.473 | 0.349 | 0.361 | 0.413 |
| Minor Impuritives $TiO_2$, $Fe_2O_3$, MgO | N/A | N/A | N/A | N/A | N/A | N/A | N/A |

*Sum of RO and $R_2O$ Groups equals 1.00 ("unity").

TABLE VII

EXAMPLES VII–XII
LOW-TEMPERATURE BARIUM/LEAD-FREE GLAZE
COMPOSITIONS
"NORMALIZED" MOLE FRACTIONS*

CHEMISTRY

| Oxide | Symbol | VII | VIII | IX | X | XI | XII |
|---|---|---|---|---|---|---|---|
| $SiO_2$ | $RO_2$ | 2.654 | 2.505 | 2.698 | 2.458 | 2.647 | 2.391 |
| $Al_2O_3$ | $R_2O_3$ | 0.335 | 0.275 | 0.318 | 0.249 | 0.290 | 0.223 |
| $B_2O_3$ | $R_2O_3$ | 1.165 | 1.059 | 1.155 | 1.022 | 1.105 | 0.973 |
| CaO | RO | 0.217 | 0.359 | 0.235 | 0.404 | 0.293 | 0.443 |
| SrO | RO | 0.072 | 0.061 | 0.075 | 0.059 | 0.073 | 0.057 |
| ZnO | RO | 0.058 | 0.046 | 0.062 | 0.045 | 0.061 | 0.043 |
| $K_2O$ | $R_2O$ | 0.108 | 0.097 | 0.104 | 0.091 | 0.101 | 0.085 |
| $Li_2O$ | $R_2O$ | 0.169 | 0.137 | 0.181 | 0.134 | 0.165 | 0.129 |
| $Na_2O$ | $R_2O$ | 0.376 | 0.300 | 0.343 | 0.267 | 0.307 | 0.243 |
| Minor Impuritives $TiO_2$, $Fe_2O_3$, MgO | N/A | N/A | N/A | N/A | N/A | N/A | N/A |

*Sum of RO and $R_2O$ Groups equals 1.00 ("unity").

TABLE VIII

EXAMPLES XIII–XVII
LOW-TEMPERATURE BARIUM/LEAD-FREE GLAZE
COMPOSITIONS
"NORMALIZED" MOLE FRACTIONS*

CHEMISTRY

| Oxide | Symbol | XIII | XIV | XV | XVI | XVII |
|---|---|---|---|---|---|---|
| $SiO_2$ | $RO_2$ | 2.712 | 2.552 | 2.652 | 2.715 | 2.624 |
| $Al_2O_3$ | $R_2O_3$ | 0.299 | 0.259 | 0.271 | 0.275 | 0.246 |
| $B_2O_3$ | $R_2O_3$ | 1.130 | 1.048 | 1.082 | 1.101 | 1.044 |
| CaO | RO | 0.251 | 0.336 | 0.307 | 0.271 | 0.311 |
| SrO | RO | 0.081 | 0.076 | 0.078 | 0.086 | 0.080 |
| ZnO | RO | 0.066 | 0.058 | 0.060 | 0.069 | 0.066 |
| $K_2O$ | $R_2O$ | 0.099 | 0.093 | 0.093 | 0.098 | 0.09i |
| $Li_2O$ | $R_2O$ | 0.190 | 0.168 | 0.185 | 0.199 | 0.191 |
| $Na_2O$ | $R_2O$ | 0.313 | 0.269 | 0.277 | 0.277 | 0.261 |
| Minor Impuritives $TiO_2$, $Fe_2O_3$, MgO | N/A | N/A | N/A | N/A | N/A | N/A |

*Sum of RO and $R_2O$ Groups equals 1.00 ("unity").

In the above examples, the spray coated ceramic substrate was fired at a temperature of 1625° F. (885° C.) for 15 minutes.

Although certain preferred embodiments of the invention are specifically illustrated and described above, it will be appreciated that various modifications, variations, substitutions, omissions, changes and the like to the present invention can be made in light of the above teachings and such are within the purview of the appended claims without otherwise departing from the spirit and intended scope of the invention.

What is claimed is:

1. A barium/lead-free ceramic glaze comprising, by weight:
   (i) between about 44 and 50% $SiO_2$;
   (ii) between about 7 and 13% $Al_2O_3$;
   (iii) between about 22 and 26% $B_2O_3$;
   (iv) between about 3 to 9% CaO;
   (v) between about 1 and 3% SrO;
   (vi) up to about 2% ZnO;
   (vii) between about 2 to 4% $K_2O$;
   (viii) up to about 2% $Li_2O$; and
   (ix) between about 5 and 9% $Na_2O$.

2. The lead-free ceramic glaze of claim 1 comprising, by weight:
   (i) between about 44.1 and 49.8% $SiO_2$;
   (ii) between about 7.7 and 12.3% $Al_2O_3$;
   (iii) between about 22.9 and 25.1% $B_2O_3$;
   (iv) between about 3.1 and 8.5% CaO;
   (v) between about 1.3 and 2.7% SrO;
   (vi) between about 0.8 and 1.7% ZnO;
   (vii) between about 2.7 and 3.3% $K_2O$;
   (viii) between about 0.8 and 1.8% $Li_2O$; and
   (ix) between about 5.1 and 9.0% $Na_2O$.

3. The lead-free ceramic glaze of claim 1 comprising, by weight:
   (i) about 47% $SiO_2$;
   (ii) about 10% $Al_2O_3$;
   (iii) about 24% $B_2O_3$;
   (iv) about 4.5% CaO;
   (v) about 2.0% SrO;
   (vi) about 1.2% ZnO;
   (vii) about 3.0% $K_2O$;
   (viii) about 1.3% $Li_2O$; and
   (ix) about 7.0% $Na_2O$.

4. A ceramic substrate coated with the composition of claim 1.

5. The ceramic substrate of claim 4 wherein said substrate is an alumina insulator of a spark plug.

6. A ceramic substrate coated with the composition of claim 2.

7. The ceramic substrate of claim 6 wherein said substrate is an alumina insulator of a spark plug.

8. A ceramic substrate coated with the composition of claim 3.

9. The ceramic substrate of claim 8 wherein said substrate is an alumina insulator of a spark plug.

10. A method for applying a barium/lead-free glaze to a ceramic comprising the steps of (i) spraying said ceramic with a slurry including the composition of claim 1 and having a solids content between about 40 and 60% and (ii) firing said coated ceramic at a temperature not greater than 1650° F.

11. The method according to claim 10, where the firing temperature is between 1550 and 1650° F.

12. A method for applying a barium/lead-free glaze to a ceramic comprising the steps of (i) spraying said ceramic with a slurry including the composition of claim 2 and having a solids content between about 40 and 60% and (ii) firing said coated ceramic at a temperature not greater than about 1650° F.

13. The method according to claim 12, where the firing temperature is between 1550 and 1650° F.

14. A method for applying a barium/lead-free glaze to a ceramic comprising the steps of (i) spraying said ceramic with a slurry including the composition of claim 3 and having a solids content between about 40 and 60% and (ii) firing said coated ceramic at a temperature not greater than about 1650° F.

15. The method according to claim 14, where the firing temperature is between 1550 and 1650° F.

16. A method for making a spark plug core assembly including an alumina insulator component and a Fired-in suppressor glass seal component comprising: (i) spraying the alumina insulator component with a slurry comprising the composition of claim 1, and (ii) simultaneously firing both the alumina insulator component and the suppressor glass seal component to form a glazed and glass sealed core assembly, said firing being carried out at a temperature not greater than about 1650° F.

17. The method according to claim 16, where the firing temperature is between 1550 and 1650° F.

* * * * *